United States Patent [19]

Bishop et al.

[11] Patent Number: 5,447,037
[45] Date of Patent: Sep. 5, 1995

[54] ECONOMIZER PREFERRED COOLING CONTROL

[75] Inventors: Richard A. Bishop; Joe M. Baldwin, both of Clarksville, Tenn.

[73] Assignee: American Standard Inc., Piscataway, N.J.

[21] Appl. No.: 221,671

[22] Filed: Mar. 31, 1994

[51] Int. Cl.[6] ............................. F25B 25/00; F25B 29/00
[52] U.S. Cl. .................................. 62/89; 62/332; 165/16
[58] Field of Search .......... 165/16, 29; 236/49, 236/3; 62/180, 332, 410, 89

[56] References Cited

U.S. PATENT DOCUMENTS

| | | | |
|---|---|---|---|
| 2,318,706 | 5/1943 | Newton | 165/16 |
| 3,887,127 | 6/1975 | Jauss | 236/49.3 X |
| 3,979,922 | 9/1976 | Shavit | 165/16 X |
| 4,265,299 | 5/1981 | Harnish | 165/16 X |
| 4,266,599 | 5/1981 | Saunders et al. | 165/16 X |
| 4,379,484 | 4/1983 | Lom et al. | 165/16 |
| 4,389,853 | 6/1983 | Hile | 62/89 |
| 4,404,815 | 9/1983 | Gilson | 62/180 |
| 4,679,411 | 7/1987 | Pearse, Jr. | 62/519 |
| 4,759,196 | 7/1988 | Davis | 62/326 |
| 4,766,807 | 8/1988 | Davis | 98/121 |
| 4,843,839 | 7/1989 | Davis | 62/326 |
| 5,039,009 | 8/1991 | Baldwin et al. | 236/51 |
| 5,237,826 | 8/1993 | Baldwin et al. | 62/77 |
| 5,276,630 | 1/1994 | Baldwin et al. | 364/505 |

*Primary Examiner*—William E. Wayner
*Attorney, Agent, or Firm*—William J. Beres; William O'Driscoll; Peter D. Ferguson

[57] ABSTRACT

A method of utilizing an economizer to reduce the energy usage of a mechanical refrigeration system. The method comprises the steps of: economizing if both cooling demand and the prerequisites to economize are present; measuring economizer capacity; determining if the measured economizer capacity is sufficient to meet the needs of a zone being conditioned; continuing to economize as long as there is both a cooling demand and the prerequisites to economize; and initiating the use of the mechanical cooling system only if the economizer capacity has been determined to be insufficient to meet the needs of the zone being conditioned.

17 Claims, 2 Drawing Sheets

ECONOMIZER PREFERRED COOLING CONTROL

TECHNICAL FIELD

This invention generally pertains to a control for a heating, ventilating, air conditioning and refrigeration (HVACR) temperature conditioning system, and specifically, to such a control capable of modulating an outdoor air economizer.

BACKGROUND OF THE INVENTION

In an HVACR system, conditioned air is supplied to each comfort zone in a building in proportional to the demand in that zone. Stages of temperature conditioning are energized as required to meet the total demand on the system.

An HVACR system often includes an outdoor air economizer for admitting fresh air into the building, thereby reducing the need for mechanical cooling. Depending upon the enthalpy of the outdoor air, a damper assembly on the economizer may be modulated between minimum and maximum positions to control the proportion of outdoor air used for cooling the building interior spaces. If an enthalpy sensor indicates that outdoor air temperature/humidity is excessive, the economizer damper is kept at its minimum position. In this minimum position, the HVACR system is taking in the minimum amount of fresh air judged to be necessary to maintain an adequate level of indoor air quality.

Staging controls for HVACR systems typically attempt to satisfy the cooling demand first with the outdoor air economizer, and if that is inadequate, thereafter by energizing successive stages of mechanical cooling. Of course, if the outdoor ambient air enthalpy is less than the enthalpy of the return air, it may be possible that outdoor air can be used to cool the building without energizing any mechanical refrigerant cooling stages. Conversely, if the outdoor ambient air enthalpy is greater than the return air enthalpy, it is unlikely that the cooling demand can be met entirely with air supplied by the economizer.

In the past, the economizer control has not been fully integrated with the temperature change conditions that are actually occurring in the zone of the building that is being cooled. There are many ways to determine when to economize and when to disable the compressor. Previously the decision to use the economizer and disable the compressor has not been based on the temperature in the zone. Typically, the decision as to whether or not to use the compressor has been made by comparison of the temperature of the outdoor air with a fixed reference temperature.

In cooling a commercial building that is occupied only during working hours, the temperature setpoint for a given zone is usually set to a relatively high level during periods in which the building is not occupied. The setpoint during night hours and on weekends is generally at a level that would be perceived as being uncomfortably warm by occupants of the building. In the morning on a day in which the building is going to be occupied, the setpoint is typically automatically adjusted downward. At this time, the HVACR system sees a marked increase in the cooling load in the zone. The control system of the HVACR system attempts to provide adequate cooling to the zone to decrease the temperature in the zone to approximate the daytime setpoint. Typically, when faced with a large setpoint change, the control system commands the compressors to energize and mechanically cool the air in the zone, without regard to whether adequate cooling capacity is available by using the economizer only.

U.S. Pat. No. 4,379,484 to Lom et al. discloses a control system that is typical of the control systems in the industry today. While the idea provides for control of the economizer, this control is limited by the fact that the controlling signal is proportional to the deviation of the discharge air temperature from the setpoint value of the discharge air. The temperature of the discharge air, of course, is not indicative of the temperature or temperatures changes in the zone that is being cooled.

U.S. Pat. No. 4,404,815 to Gilson discloses an economizer control system. This control system senses the temperature of the mixed return air from the cooled zone and the outdoor ambient air from the economizer just prior to that mixed air entering the indoor coil of the air conditioning unit. The control system uses this temperature to select the combination of economizer and compressor cooling necessary to meet the cooling requirements. Again, this temperature has a temperature that is not truly indicative of the temperature and temperature changes occurring in the zone that is to be cooled.

U.S. Pat. No. 4,389,853 to Hile discloses a third means of controlling an economizer. The idea disclosed in this patent utilizes a thermostat to sense the temperature of the air in the zone to be cooled and compares that temperature to a setpoint. The thermostat is designed to generate an increasing cooling command signal as the variance between the setpoint and the desired temperature increases. As the command increases, greater reliance is placed on mechanical cooling as distinct from economizer cooling. Accordingly, this system will command mechanical cooling during periods of large setpoint variance without regard to whether or not the economizer can adequately provide the desired cooling necessary.

Economizer cooling is the most energy efficient means of cooling a zone. Electrical energy is being sent only to power the fans necessary to force the air through the zone. Mechanical cooling also requires these fans plus requires the substantial energy necessary to run the compressors and related equipment. Accordingly, it is always desirable to cool a zone utilizing the economizer when the economizer has the capability of providing the desired level of cooling. In order to most effectively determine if the economizer is capable of providing the desired level of cooling, it is necessary to integrate the control of the economizer with the actual temperature and temperature changes that are occurring in the zone to be cooled. It would be a decided advantage in the industry to have a economizer control system that is fully integrated into temperature and temperature changes that are occurring in the zone to be cooled. Such a system would make maximum use of the cooling that is available from the outside ambient air and would minimize the mechanical cooling that is required to maintain a zone at a desired setpoint. This enhanced means of control would be especially useful during the times of large setpoint change, as when the setpoint in the zone is changed from the relatively high night time setpoint to the relatively lower day time setpoint.

SUMMARY OF THE INVENTION

The present invention provides for an economizer control system that is fully integrated with the temperature and temperature changes that are occurring in the zone to be cooled. A control system exhibits a definite bias for providing cooling of the zone by means of the economizer only. The control system provides for the utilization of mechanical cooling, either in conjunction with the economizer or alone, only when it has been determined by sensing the temperature and temperature changes occurring in the zone that the economizer cooling is not sufficient to meet the cooling requirements or when the economizer is enthalpy disabled.

Unlike previous systems, the present invention makes a determination that the economizer cannot satisfy the needs of the HVACR system and that economizer cooling is actually reaching the zone. Only when that determination is made will mechanical cooling be implemented.

The present invention provides a control for a temperature conditioning system which controls the temperature in a zone and which includes an outdoor air economizer mechanical cooling stages. The control comprises: an outdoor ambient air enthalpy sensor; a return air enthalpy sensor; and a device and controller for selectively modulating the economizer in one of two modes when the outdoor air enthalpy is sensed to be less than the return air enthalpy. The first mode is economizer only cooling when the economizer capacity has been determined to be sufficient to cool the zone. The second mode is economizer cooling augmented by mechanical cooling when the economizer has been operating at full capacity for a selected period of time and, during such period of time, the zone temperature is being satisfied.

The present invention further provides a control for a temperature conditioning system which includes an outdoor air economizer and one or more mechanical cooling stages for cooling a comfort zone with circulated discharge air made up of outdoor air and return air in desired portions. The control includes an outdoor ambient air enthalpy sensor; a return air enthalpy sensor; and a device and controller for modulating the economizer in response to the rate of change of the air temperature in the zone so as to control the admission of discharge air to cool the zone, unless the outdoor ambient air enthalpy is greater than the return air enthalpy. In which case, the device and controller are operative to modulate the economizer to restrict admittance of outdoor air and to cool the zone utilizing the mechanical states as the primary means to cool and recirculate the return air. The outdoor air economizer is capable of being modulated between a minimum open position and a fully open position, the control further includes a device for determining that the outdoor air economizer is in the full open position; a device for determining the period of time that the outdoor economizer has been in the full open position; and a device for modulating the mechanical cooling stages responsive to the rate of change of the temperature in the zone of a selected period of time during which the economizer was in the full open position.

The present invention still further provides a method of utilizing an economizer to reduce the energy usage of a mechanical refrigeration system. The method comprises the steps of: economizing if both cooling demand and the prerequisites to economize are present; measuring economizer capacity; determining if the measured economizer capacity is sufficient to meet the needs of a zone being conditioned; continuing to economize as long as there is both a cooling demand and the prerequisites to economize; and initiating the use of the mechanical cooling system only if the economizer capacity has been determined to be insufficient to meet the needs of the zone being conditioned.

The present invention yet further provides a method of economizing. The method comprises the steps of: establishing that the criteria for economizer operation are met; operating the economizer; monitoring the economizer capacity; determining a length of time that the economizer has been operating at its full capacity; verifying that the length of time that the economizer has been at full capacity is greater than a selected time period; determining, subject to the verifying step, that the economizer capacity is sufficient to meet the needs of the zone being conditioned; and operating a mechanical refrigeration system only if the economizer capacity has been determined by the determining step to be insufficient to meet the zone needs.

DETAILED DESCRIPTION OF THE INVENTION

Figure 1:
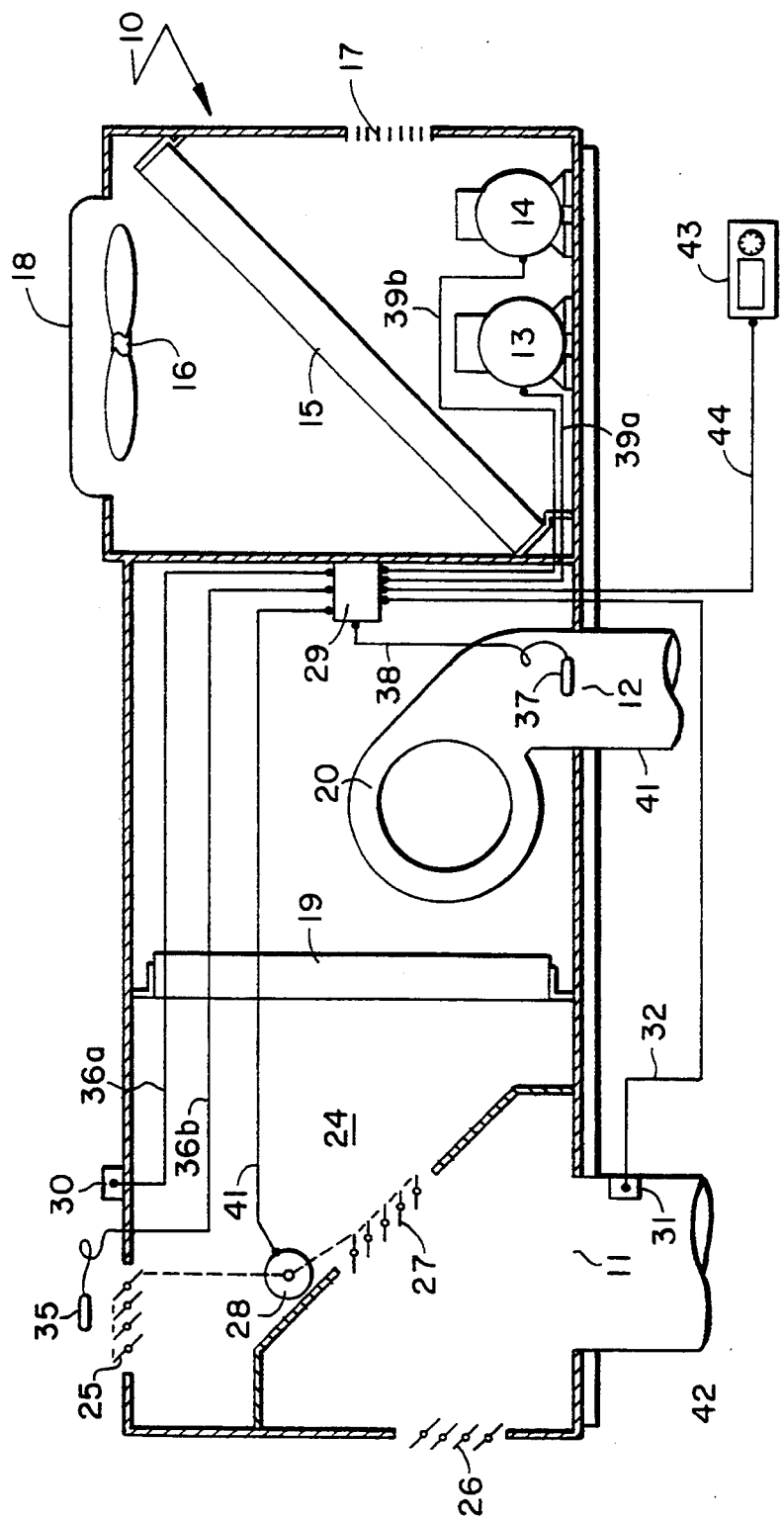
FIG. 1 is a schematic diagram of a typical HVACR system having four stages of cooling and an outdoor air economizer, to which the control of the subject invention is applied.

With reference to FIG. 1, the HVACR system is generally denoted by numeral 10. Although the preferred embodiment is directed to a constant volume system such as that described in U.S. Pat. No. 4,678,411 to Pearse, Jr., the invention also applies to variable air volume systems such as that described in U.S. Pat. No. 4,379,484 to Lom et al. Each of these patents is assigned to the assignee of the present invention and each of these patents is hereby incorporated by reference.

The HVACR system 10 is adapted for installation on the roof of a building, and is provided with a return air port 11 and a discharge air or supply air port 12. These ports 11, 12 are in fluid communication with the supply air duct 41 and the return air duct 42, respectively, and are installed as part of the temperature conditioning system of the building. This duct work 41, 42 is not fully shown; however, the design of such duct work 41, 42 for supplying conditioned air to comfort zones in a HVACR system 10 is well known to those skilled in the art. The supply air duct 41 circulates discharge air to the zone to be cooled via registers (not shown) opening into the zone. The return air duct 42 circulates air from the zone back to HVACR system 10.

The elements which comprise the HVACR system 10 may include first and second refrigerant compressors 13 and 14, each of which has two stages or may include one to four distinct compressors. Compressors 13 and 14 are also provided with unloading means so that they can be operated with one stage de-energized. This provides a total of four refrigerant compressor stages which may be selectively energized to meet the temperature conditioning demand of the building zones.

Compressors 13 and 14 are connected in a typical refrigerant cooling cycle and are operative to compress a refrigerant vapor which is supplied to a condenser heat exchanger 15. A condenser fan 16 draws outdoor air from an inlet 17 through the condenser 15, exhausting it through an outlet 18. Heat is transferred from the refrigerant vapor to the outdoor air in condenser 15, causing the refrigerant vapor to condense into a liquid. The condensed liquid is supplied to an evaporator heat exchanger 19 through an expansion valve (not shown). A circulating fan 20 draws air through evaporative heat exchanger 19, and circulates it throughout the building zones. Air passing through evaporator 19, is cooled by heat transfer with the vaporizing refrigerant. The refrigerant vapor then returns to compressors 13 and 14 to repeat the cycle.

Air flowing through heat exchanger 19 and thereafter throughout the building zones is typically a mixture of return air entering the HVACR system 10 through return air duct 42 and return air port 11 and of outdoor air entering through an outdoor air economizer damper 25 of economizer 24. The percentage of outdoor air entering the building is determined by the relative opening of the outdoor air economizer damper 25, the exhaust air damper 26, and the return air damper 27. The outdoor air damper 25 and the return air damper 27 are simultaneously positioned by the actuator 28 of the economizer 24 while the exhaust air damper 26 typically opens naturally in response to building pressurization. If the outdoor air economizer damper 25 is set to its maximum open condition, the return air mixing damper 27 is completely closed. Under these conditions, 100% outdoor ambient air is supplied to the building by the economizer 24 through the discharge air port 12 by the circulating fan 20. The actuator 28 is connected to simultaneously modulate the return air mixing damper 27 open as the outside air economizer damper 25 is modulated toward its minimum open position. The exhaust air damper 26 operates independently of the other dampers. This operating relationship between the three dampers 25, 26 and 27 of economizer 24 ensures proper air pressure balance in the economizer 24 section of the HVACR system 10. The actuator 28 typically is a bi-directional motor such as a Honeywell, Inc., Model M975, connected to selectively open or close the dampers 25, 27, as described above. Several typical economizers are shown in applicant's commonly assigned U.S. Pat. Nos. 4,759,196; 4,766,807 and 4,843,839, all to Davis and all incorporated herein by reference.

The control means 29 are provided both for selectively energizing the four stages of compressors 13 and 14 in response to cooling demand, and for controlling the modulation of outdoor air economizer 24 by energizing actuator 28. An enthalpy sensing means such as an outdoor air enthalpy sensor 30 and outdoor air temperature sensor 35 are separately connected to control means 29 by leads 36a and 36b, respectively. Enthalpy may also be determined, as in the preferred embodiment, by calculating enthalpy using outdoor air humidity and temperature. A discharge air temperature sensor 37 is connected to control means 29 by lead 38. A return air enthalpy sensor 31 is connected to control means 29 by lead 32. The compressor control lines 39a and 39b connect the control means 29 to the compressors 13 and 14 for control of compressor staging. The leads 41 connect the actuator means 28 to the control means 29. A controller 43, such as a thermostat or a zone sensor interface with a microprocessor, is connected by leads 44 to control means 29. The controller 43 is preferably located in the building zone (not shown) that is to be cooled. The controller 43 may be of the type that is programmable and which automatically increases the temperature setpoint in the evening and reduces the temperature setpoint in the morning. The setpoint may also be manually adjusted or set remotely by a building automation system. Various control means and controllers as shown in applicant's commonly assigned U.S. Pat. Nos. 5,039,009; 5,237,826 and 5,276,630, all to Baldwin et al. and all incorporated herein by reference. These patents also discuss economizers and economizer control.

Figure 2:
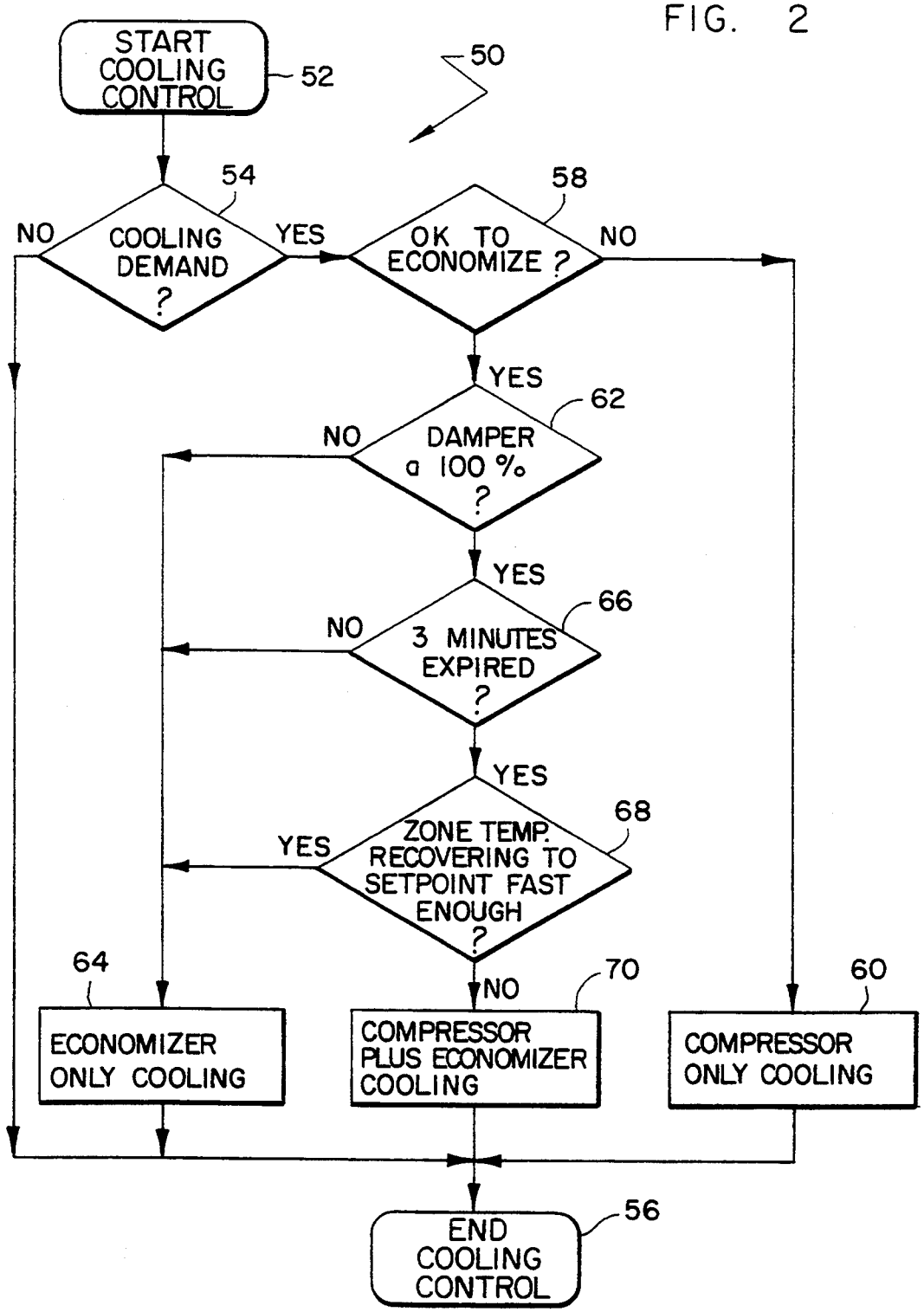
FIG. 2 is a schematic diagram of a control program for the typical HVACR system.

Operation of control means 29 will be explained hereinbelow with reference to FIG. 2. Control routine 50 is shown generally in a schematic format in FIG. 2. Control routine 50 is run continuously during operation of the HVACR system 10. The control routine 50 starts with the start cooling control 52. The first decision is stated at decision point 54 as "is there a cooling demand?" If the answer is no, control routine 50 exits and ends at ending cooling control 56. If the answer at decision point 54 is yes, control routine 50 moves to decision point 58. The determination in decision point 54 depends upon the output of the controller 43. The controller 43 has a setpoint determined manually, remotely or automatically. The controller 43 additionally has a temperature sensor that senses the temperature in the zone to be cooled. If the temperature that is sensed in the zone to be cooled is greater than the temperature setpoint, there is a cooling demand and the answer at decision point 54 is yes. If the setpoint temperature is less than or equals the sensed temperature in the zone, the answer is no.

Decision point 58 asks the question "is it okay to economize?" Steps 52 and 58 determine that the prerequisites to economizing are met, i.e. that the conditions are correct. The decision to economize or not to economize is based upon the comparison of the enthalpy of the return air to the enthalpy of the outside air. Enthalpy of the outside air is measured by a enthalpy sensor 30 and provided to control means 29. Enthalpy of the return air is measured by enthalpy sensor 31 and is also provided to control means 29. When the enthalpy of the outside air is less than the enthalpy of the return air it makes sense economically to utilize the economizer 24 because energy can transferred from inside air to the outside air to provide cooling. In instances in which the enthalpy of the return air is less than the enthalpy of the outside air, the decision at decision point 58 is no and control routine 50 commands compressor only cooling as indicated at 60. During compressor only cooling, the exhaust air damper 26 is closed and outside air damper 25 is at minimum position. The return air damper 27 is fully opened to permit all of the return air be recooled and recirculated by the HVACR system 10 to the zone. This situation typically occurs on days having high outside ambient air temperatures.

If the enthalpy of the outside air is less than the enthalpy of the return air as measured by enthalpy sensors 30, 31, the decision at decision point 58 is to utilize the economizer 24. If the decision at decision point 50 is to economize, control routine 50 moves to decision point 62.

Decision point 62 asks "is outdoor air damper 25 of economizer 24 100% open?" If the outdoor air damper 25 is fully opened, then the return air mixing damper 27 is fully closed. In this condition, the return air is being fully exhausted through the action of the exhaust damper 26, and only air drawn through outdoor air damper 25 is being utilized to make up the supply air to the zone to be cooled. If the answer at decision point 62 is that the outdoor air damper 25 is less than fully opened, control routine 50 commands economizer only cooling as indicated at 64. This condition would exist on a day when the outside air temperature is typically rather low. The economizer 24 has additional capacity to cool the zone as indicated by the fact that the outside air damper 25 is only partially opened. Accordingly, control routine 50 has determined that the cooling demands in the zone can be met with the economizer only cooling.

In the instance that decision point 62 determines that the outside air damper 25 is fully open, the control routine 50 must determine whether the economizer can meet the load on the HVACR system 10 and whether the economizer cooling is reaching the zone or zones being cooled. As part of this determination, the control routine 50 moves to decision point 66. When damper 25 is fully opened, economizer 24 is providing the maximum amount of cooling available using outdoor air only. Decision point 66 looks to see if a fixed amount of time has expired during which damper 25 has been fully opened. This ensures that economizer cooling has had sufficient time to have an effect on the zone or zones being conditioned. In the preferred embodiment, the control routine 50 has been programmed to look at a three minute interval. It is understood that a greater or lesser time period may be satisfactorily utilized.

In the instance that the decision at decision point 66 is no, indicating that less than three minutes has expired, control routine 50 commands economizer only cooling as indicated at 64. The effect of this command is to prevent the initiation of any mechanical cooling for at least three minutes after outside air damper 25 has been in the full opened position. This command is designed to permit economizer 24 to operate at its maximum cooling condition for a limited period of time in order to establish the ability of economizer 24 to cool the zone.

If the decision at decision point 66 is yes, control routine 50 moves to decision point 68. Decision point 68 asks the question "is the zone temperature recovering to the setpoint fast enough?" At decision point 68, controller means 29 looks at the time history of the temperature in the zone as reported to control means 29 by the controller 43. Control means 29 examines the temperature history over the time period specified in decision point 66 to determine a recovery rate for the zone. Control means 29 compares the recovery rate of the temperature in the zone with a desired rate of change of temperature in the zone to verify that the capacity is enough to return the zone temperature to the desired temperature and to verify that economizer cooled air is actually reaching the zone. Verification that economizer cooling is actually reaching the zone is made when a temperature change occurs in the desired direction. The recovery rate is determined by looking at the smallest measurable temperature change during a selected time period. In the preferred case, control means 29 looks to see if there has been a measurable change in temperature during the three minute elapsed time indicated at decision point 66. The desired rate of temperature change in the zone is 12° Fahrenheit per hour. It is understood that a greater or lesser rate of temperature change may be used satisfactorily with control routine 50. In the preferred embodiment, the smallest measurable rate of change equates to the 12° Fahrenheit per hour rate of change that is desired.

In the instance in which the determination at decision point 68 is yes, the control routine 50 commands economizer 24 only cooling as indicated at 64. This is reflective of the fact that the economizer 24 acting alone is meeting the desired rate of change of temperature in the zone. Accordingly, it is determined that no mechanical cooling is necessary.

In the instance in which the determination at decision point 68 is no, this is an indication that, while the economizer 24 is contributing to the cooling of a zone, there is not enough cooling from the economizer 24 alone to provide the desired rate of change of temperature. Accordingly, control routine 50 commands compressor cooling in addition to economizer 24 cooling as indicated at 70. In this mode of operation, the economizer 24 is contributing the maximum amount of cooling that economizer 24 is capable of and this amount of cooling is augmented by the mechanical cooling necessary from compressors 13, 14 that is needed to change the temperature in the zone at the desired rate.

It is further to be understood that modifications such as those noted above will be apparent to those skilled in the art within the scope of the invention, as defined in the claims which follow.

We claim:

1. A control for a temperature conditioning system which controls the temperature in a zone and which includes an outdoor air economizer and mechanical cooling stages, comprising:
   a. an outdoor air enthalpy sensor sensing outdoor ambient air enthalpy;
   b. a return air enthalpy sensor sensing a return air enthalpy; and
   c. a controller selectively modulating the economizer in one of two modes when the outdoor air enthalpy has been determined to be suitable for economizing, the first mode being economizer only cooling when the economizer capacity has been determined to be sufficient to cool the zone and the second mode being economizer cooling augmented by mechanical cooling when the economizer has been operating at full capacity for a selected period of time and, during such period of time, zone temperature demand is not being satisfied;

further including
   a zone sensor operably connected to the controller and monitoring the recovery rate of temperature in the zone;
   means for verifying that the economizer has been at a defined full capacity for the selected period of time; and
   means for comparing the recovery rate to a minimum acceptable recovery rate.

2. The control of claim 1 further including means for determining whether economizer cooling is reaching a zone being conditioned.

3. The control of claim 2 wherein the economizer cooling determination means includes means for determining whether the rate of change of temperature in the zone is less than desired.

4. A control for a temperature conditioning system which includes an outdoor air economizer and one or more mechanical cooling stages for cooling a comfort zone with circulated discharge air made up of outdoor air and return air in desired portions, comprising:
   a. an outdoor air enthalpy sensor sensing an outdoor ambient air enthalpy;

b. a return air enthalpy sensor sensing a return air enthalpy; and c. means for modulating the economizer in response to the rate of change of the air temperature in the zone so as to control the admission of discharge air to cool the zone, unless the outdoor ambient air enthalpy is greater than the return air enthalpy; in which case, said means are operative to modulate the economizer to restrict admittance of outdoor air and to cool the zone utilizing the mechanical states as the primary means to cool and recirculate the return air, wherein the outdoor air economizer is capable of being modulated between a minimum open position and a fully open position, and further including;

d. means for determining that the outdoor air economizer is in the full open position;

e. means for determining the period of time that the outdoor economizer has been in the full open position; and f. means for modulating the mechanical cooling stages responsive to the rate of change of the temperature in the zone of a selected period of time during which the economizer was in the full open position.

5. The control of claim 4 further including means for determining whether economizer cooling is reaching a zone being conditioned, and means for ensuring that zone temperature demand is being satisfied.

6. A control for a temperature conditioning system which includes an outdoor air economizer and one or more mechanical cooling stages for cooling a comfort zone with circulated discharge air made up of outdoor air and return air in desired portions, comprising:

a. means for sensing an outdoor ambient air enthalpy;

b. means for sensing a return air enthalpy; and c. means for modulating the economizer in response to the rate of change of the air temperature in the zone so as to control the admission of discharge air to cool the zone, unless the outdoor ambient air enthalpy is greater than the return air enthalpy; in which case, said means are operative to modulate the economizer to restrict admittance of outdoor air and to cool the zone utilizing the mechanical states as the primary means to cool and recirculate the return air, wherein the modulating means further includes:

d. means for monitoring the recovery rate of the temperature in the zone;

e. means for verifying that the economizer has been at a defined full capacity for a selected period of time; and f. means for comparing the recovery rate to a minimum acceptable recovery rate.

7. The control of claim 6 wherein economizing does not occur until prerequisites are met and wherein the prerequisites to economize include:

means, associated with the modulating means, for verifying that the outdoor air enthalpy is less than the return air enthalpy.

8. A method of utilizing an economizer to reduce the energy usage of a mechanical refrigeration system, the method comprising the steps of:

economizing if both cooling demand and the prerequisites to economize are present;

measuring economizer capacity;

determining if the measured economizer capacity is sufficient to meet the needs of a zone being conditioned;

continuing to economize as long as there is both a cooling demand and the prerequisites to economize; and initiating the use of the mechanical cooling system only if the economizer capacity has been determined to be insufficient to meet the needs of the zone being conditioned;

wherein the measuring and determining steps include the further steps of:

monitoring the recovery rate of a condition in a zone;

verifying that the economizer has been at a defined full capacity for a selected period of time; and comparing the recovery rate to a minimum acceptable recovery rate.

9. The method of claim 8 wherein the minimum acceptable recovery rate equates to approximately 12° F. per hour.

10. The method of claim 8 including the further step of determining whether economizer cooling is reaching a zone being conditioned.

11. The method of claim 10 wherein the economizer cooling determination includes the further determination regarding whether zone temperature demand is being satisfied.

12. The method of claim 8 wherein the condition being monitored is air temperature, air humidity, or air pressure.

13. The method of claim 12 wherein the selected period of time is approximately three minutes.

14. The method of claim 13 wherein the prerequisites to economize include the steps of:

measuring an outdoor air condition;

measuring a return air condition; and verifying that the outdoor air condition is less than the return air condition.

15. The method of claim 14 wherein the outdoor air and return air conditions being monitored are enthalpy or temperature.

16. A method of economizing comprising the steps of:

establishing that the criteria for economizer operation are met;

operating the economizer;

monitoring the economizer capacity;

determining a length of time that the economizer has been operating at its full capacity;

verifying that the length of time that the economizer has been at full capacity is greater than a selected time period;

determining, subject to the verifying step, that the economizer capacity is sufficient to meet the needs of the zone being conditioned; and operating a mechanical refrigeration system only if the economizer capacity has been determined by the determining step to be insufficient to meet the zone needs;

wherein the verifying step includes the further steps of monitoring a recovery rate of a condition in the zone and comparing the recovery rate to a minimum acceptable recovery rate.

17. The method of claim 16 including the further step of determining if the economizer cooling capacity is reaching the zone being conditioned.

* * * * *